1,175,762.

W. H. HOLLAND.
SEAT FOR MOTOR AND OTHER VEHICLES.
APPLICATION FILED JAN. 7, 1914.

Patented Mar. 14, 1916.

UNITED STATES PATENT OFFICE.

WILLIAM HEAP HOLLAND, OF ALDERLEY EDGE, ENGLAND.

SEAT FOR MOTOR AND OTHER VEHICLES.

1,175,762. Specification of Letters Patent. Patented Mar. 14, 1916.

Application filed January 7, 1914. Serial No. 810,693.

*To all whom it may concern:*

Be it known that I, WILLIAM HEAP HOLLAND, a subject of the King of Great Britain and Ireland, and a resident of Alderley Edge, in the county of Chester, England, have invented new and useful Improvements in Seats for Motor and other Vehicles, of which the following is a specification.

This invention relates to motor and other vehicles of the type in which the seats have spring controlled angular movement relatively to the body of the vehicle around a center which is placed in or near to the plane or part upon which the feet of the user will or should rest.

This invention consists in mounting the seat upon two radius rods or bars arranged underneath the floor of the car body and which are pivoted in a common axis in or close to the foot board or rest or part which the feet of the user will or should occupy.

The accompanying drawings illustrate the combination of the improved seat, supports, and accessories, with a motor vehicle, and will now be referred to.

Figure 1 shows the improved arrangement in elevation. Fig. 2 shows it in plan. Fig. 3 is a view of a modification of the mode of mounting the shaft of the radius rods.

Although my improvements are only represented as applied to the front seats of a car they are equally applicable to rear or other seats.

Referring to the drawings A represents the floor of the car body and B an inclined foot board upon which the feet of the users of the seats rest. Two seats disposed side by side and entirely separate from the sides and back of the body are shown in the drawings. Close to and about in a prolongation of the lower edge of the foot board B are pivoted two parallel radius rods C C on a shaft C¹, one rod on each side of the car. These rods carry by suitable adjustable supports D, D, a frame E upon which the seats rest. The frame has pivotal connections to the upper ends of the supports D so that its "rake" as well as its height can be easily adjusted by adjustment of the lengths of the supports D. To permit this adjustment each support is divided in its length and the inner ends are respectively screwed with a right hand and with a left hand thread and engaged with a nut correspondingly screwed. By rotation of its nut a support can be lengthened or shortened.

I am aware that a seat which is hinged at its rear edge has before now had its front edge raised or lowered by like screwed rods and nuts and I wish it to be clearly understood that my claim in respect of such an adjusting device is confined solely to a seat which is spring supported in the manner hereinafter fully described.

The frame is held in its highest position by means of strong suspension springs F F attached to the bottom of the car body and to the rods C, or the spring attachment may be to any other suitable part of the body or chassis. These springs are of sufficient strength to give proper spring suspension to the seats when the latter are occupied. Springs G of lesser strength may be mounted around the lower ends of the supports D to act as compression buffers. The supports D where they pass through the floor of the body of the car may act as guides to the seats, or special guides may be provided.

The foot board or rest B is shown as being rigidly placed on the floor of the car. If desired, however, it may be secured to and carried by forward extensions from the rods C so that it, too, moves angularly around the same center as the seats.

Two seats are shown as being mounted upon a single pair of radius rods. It is obvious however that this is not a perfect arrangement, as when one seat only is occupied there is an unbalanced pressure upon the springs, and springs which would act perfectly under the weight of two users will not do so under the weight of one. To overcome this disadvantage in use the springs F may have their tensions adjustable so that those connected with the radius rod C under the unoccupied seat can be put under less tension than those under the occupied seat. Such an adjustment can be effected by attaching the upper ends of the springs F to screws which can be screwed up and down through the floor of the car. Each seat may of course, be carried singly by its own pair of radius rods, supports, and frame, and have movement quite independently of any other seat.

Each seat may be hinged to the front edge of the frame E so that it can be turned upward and over around such hinge by lifting its rear edge off its frame. When the seat is thus raised access can be obtained to a box or to other articles which are normally below the seat.

To prevent locking or "jamming" of the supports D where they pass through their guides it is preferred to give a slight amount of freedom of movement to the shaft $C^1$. Endwise movement in its bearings is easily provided for. To permit other movement of such shaft it may be mounted in a "floating" bearing such as is shown on a large scale in Fig. 3 where L is a bearing for the shaft $C^1$, such bearing being supported by springs H in a ring K carried by the car body or chassis. However, the movement of the shaft $C^1$ other than a rotary movement on its axis will be slight and any considerable lateral movement of the shaft and the rods C C will be prevented by bosses or bearings M formed at the ends of these rods and through which the shaft $C^1$ passes, since these bearings or bosses rigidly connected to the shaft $C^1$ will engage the walls of the slot in the floor, as is shown in Fig. 2, or will abut against the fixed bearing K, and thus limit the lateral movement of the rod and hence the seat.

Packing pieces of various thicknesses may be attached to or detached from the foot rest B to suit the different lengths of legs of users of the seat, or such foot rest may be mounted in adjustable supports by which its distance from the seat may be varied. For example the foot rest may be a board the ends of which may be inserted in any pair of a plurality of pairs of slots in the manner of a stretcher in a row boat. Or the seats may be adjustable in a "fore and aft" direction. The radius rods and springs for supporting them may be of other shape and disposition than those described to obtain the same effects.

With the described spring and separate arrangement of seat supports the seat itself may be made harder than is at present usual, and while all the vibration absorption of a soft seat is obtained through the spring suspension, the continuous bending of the knees and, when desired, also of the ankles of the user of the soft seat while a car is running is avoided, and the fatigue of a long journey is very much diminished.

What I claim is:—

1. In a motor car, a body part, a seat movable angularly relatively to the sides and floor of such body part, springs controlling the movement of the seat, and radius bars underneath the floor of the car body movably attaching the seat to a center situated about the foot rest portion in the car body, substantially as set forth.

2. In a motor car, a body part, a seat movable angularly relatively to the sides and floor of such body part, springs controlling the movements of the seat, radius bars underneath the floor of the car body attaching the seat to a center around which it angularly moves, and a foot rest carried by the radius bars, substantially as hereinbefore described.

3. In a motor car, a body part, a seat movable angularly relatively to the sides and floor of such body part, springs controlling the movements of the seat, radius bars underneath the floor of the car body attaching the seat to a center around which it angularly moves, and an adjustable foot rest carried by the radius bars, substantially as hereinbefore described.

4. In a motor car, a body part, a seat movable angularly relatively to the sides and floor of such body part, springs controlling the movements of the seat, radius bars underneath the floor of the car body and floating bearings for such radius bars, substantially as set forth.

5. In a motor car, a body part, a seat movable angularly relatively to the sides and floor of such body part, springs controlling the movements of such seat, radius bars underneath the floor of the car body attaching the seat to a center, and adjustable supports between the radius bars and the seat, substantially as hereinbefore described.

6. In a motor car, a body part, a seat frame angularly movable relatively to the sides and floor of such body part, a liftable seat hinged by its front edge to such frame, springs controlling the movement of the frame, and radius bars underneath the floor of the car body attaching the seat frame to a center around which it angularly moves, substantially as hereinbefore described.

7. In a motor vehicle, a body part, a seat within said body, means for permitting angular movement of the seat relatively to the sides and floor of such body part, said means comprising a rigid member pivotally connected to the vehicle at one end and resilient means for supporting the said member from the vehicle, said seat rigidly mounted on said member, and being disposed at such a distance from the pivot that the feet of the user rest near the pivot.

8. In a motor vehicle, a body part, a seat within said body, means for permitting angular movement of the seat relatively to the sides and floor of such body part, said means comprising a rigid member pivoted at one end to the vehicle and resiliently supported at the other end, said seat rigidly mounted on said member, and being disposed at such a distance from the pivot that the feet of the user rest near the pivot.

9. In a motor vehicle, a body part, a seat within said body, means for permitting angular movement of the seat relatively to the sides and floor of such body part, said means comprising a rigid member pivotally mounted to the vehicle, springs connected to the member and to the vehicle, said seat rigidly mounted on the member and being disposed at such a distance from the pivot that the feet of the user rest near the pivot.

10. In a motor vehicle, a body part, a seat within said body, means for permitting angular movement of the seat relatively to the sides and floor of such body part, said means comprising a rigid member pivotally connected to the vehicle at one end and resilient means for supporting the said member from the vehicle, said seat rigidly mounted on said member, and being disposed at such a distance from the pivot that the feet of the user rest near the pivot, and means for limiting lateral movement of the rigid member.

11. In a motor vehicle, a body part, a seat within said body, means for permitting angular movement of the seat relatively to the sides and floor of such body part, said means comprising a rigid member pivoted at one end to the vehicle and resiliently supported at the other end, said seat rigidly mounted on said member, and being disposed at such a distance from the pivot that the feet of the user rest near the pivot, and means for limiting lateral movement of the rigid member.

12. In a motor vehicle, a body part, a seat within said body, means for permitting angular movement of the seat relatively to the sides and floor of such body part, said means comprising a rigid member pivotally mounted to the vehicle springs connected to the member and to the vehicle, said seat rigidly mounted on the member, and being disposed at such a distance from the pivot that the feet of the user rest near the pivot, and means for limiting lateral movement of the rigid member.

13. In a motor vehicle, a body part, a seat within said body, means for permitting angular movement of the seat relatively to the sides and floor of such body part, said means comprising a rigid member pivotally connected to the vehicle at one end and resilient means for supporting the said member from the vehicle, said seat rigidly mounted on said member, and being disposed at such a distance from the pivot that the feet of the user rest near the pivot, and means for limiting lateral movement of the rigid member.

In witness whereof I have hereunto set my hand in the presence of two subscribing witnesses.

WILLIAM HEAP HOLLAND

Witnesses:
   WILLIAM GEO. HEYS,
   EWALD SIMPSON MOSELEY.

Copies of this patent may be obtained for five cents each, by addressing the "Commissioner of Patents, Washington, D. C."